UNITED STATES PATENT OFFICE.

REINHOLD GRÜTER AND HEINRICH POHL, OF CHARLOTTENBURG, GERMANY.

MANUFACTURE OF A STABLE PREPARATION FROM HYDROGEN PEROXID AND UREA.

1,040,665.   Specification of Letters Patent.   Patented Oct. 8, 1912.

No Drawing.   Application filed September 12, 1911. Serial No. 648,995.

*To all whom it may concern:*

Be it known that we, REINHOLD GRÜTER and HEINRICH POHL, residing at Charlottenburg, in the Empire of Germany, have invented certain new and useful Improvements in the Manufacture of a Stable Preparation from Hydrogen Peroxid and Urea, of which the following is a specification.

This invention relates to an improved process of producing stable double compounds of hydrogen peroxid and urea.

Tanatar (*Chemisches Centralblatt* 1908 II, 583) has described the production of an addition product of the formula:

from urea and hydrogen peroxid by adding strong hydrogen peroxid in excess to urea and evaporating the mass in the water bath or in the exsiccator over sulfuric acid. The product which Tanatar obtained in this way is however, so unstable, as to be incapable of commercial introduction as a solid hydrogen peroxid preparation, since this product which on formation contains 36 per cent. of hydrogen peroxid, (as has been confirmed by experiments), is stated by Tanatar to contain only 31.5 per cent. of $H_2O_2$ after the lapse of 21 days and only 15 per cent. after the lapse of 6 months.

We have now found that this product can be obtained in a more stable form when a small quantity of a substance of a weakly acid nature is added to the solution before concentration.

The instability of the urea-hydrogen peroxid is probably due to the splitting off of small quantities of ammonia from the urea when the product is kept, and which then lead to the gradual decomposition of the product.

We have found that the addition of very small quantities of substances having an acid reaction will reduce the liability of the preparation to decomposition. Substances which have not a strongly pronounced acid character are most suitable for the purpose. Strongly acid substances are found to be less advantageous. On the other hand quite weakly acid substances, for instance acid salts such as acid sodium phosphate, sodium bitartate, boric acid and so forth, are found to act excellently. The quantity of the added substance needs only to be very small. A fraction of one per cent. relatively to the quantity of urea will suffice.

We have further found that the double compound of urea and hydrogen peroxid can also be obtained in a more stable form by carrying out the production in a different way from that followed by Tanatar.

We have found that the double compound can be obtained from aqueous solutions or from solutions in hydrogen peroxid, by crystallization and separation from the mother liquor.

The operation may advantageously consist in dissolving the urea in the warm in strong hydrogen peroxid in excess, and crystallizing out by cooling. The double compound separates out in fine large crystals of about one centimeter in length, very similar in outward appearance to the urea crystals. It is found to contain 35.5–36 per cent. $H_2O_2$ (theoretical proportions 36.17). The stronger the hydrogen peroxid employed the more closely does the oxygen content approximate to the theoretical value.

The slight difference by which the preparation falls short of the theoretical content of $H_2O_2$ is probably due to some water taking part in the crystallization. The preparation obtained by crystallization is distinguished by this small difference from that obtained by evaporation, which latter was obtained with the theoretical content of 36.17 per cent.

The stability of the product obtained by crystallization can be further increased by employing small additions of acid-yielding substances as before mentioned. The crystals which separate out then contain traces of the added substance. The mother liquor is then concentrated with the remainder of the added substance therein and likewise yields a stable product.

We claim:—

The process herein described of producing a stable double compound of hydrogen peroxid and urea, which comprises dissolving urea in hydrogen peroxid in excess and adding a small quantity of a substance having an acid reaction and then crystallizing the double salt of urea and hydrogen peroxid from the solution.

In testimony whereof we affix our signatures in presence of two witnesses.

REINHOLD GRÜTER.
HEINRICH POHL.

Witnesses:
PAUL SCHULTZE,
MAX MAETSCHKE.